United States Patent
Trentini et al.

(10) Patent No.: US 11,997,088 B2
(45) Date of Patent: May 28, 2024

(54) SELECTIVE AUTHENTICATION OF NETWORK DEVICES

(71) Applicant: CyberLucent, Inc., San Diego, CA (US)

(72) Inventors: Michael Trentini, Desert Blume (CA); Mahmoud Gad, Ottawa (CA)

(73) Assignee: CYBERLUCENT INC., San Diego, CA (US)

( * ) Notice: Subject to any disclaimer, the term of this patent is extended or adjusted under 35 U.S.C. 154(b) by 348 days.

(21) Appl. No.: 17/409,501

(22) Filed: Aug. 23, 2021

(65) Prior Publication Data
US 2022/0060474 A1 Feb. 24, 2022

Related U.S. Application Data

(60) Provisional application No. 63/068,953, filed on Aug. 21, 2020.

(51) Int. Cl.
*H04L 29/06* (2006.01)
*H04L 9/40* (2022.01)

(52) U.S. Cl.
CPC ...... *H04L 63/0876* (2013.01); *H04L 63/0236* (2013.01); *H04L 63/102* (2013.01); *H04L 63/20* (2013.01); *H04L 63/08* (2013.01); *H04L 63/1408* (2013.01); *H04L 63/1433* (2013.01)

(58) Field of Classification Search
CPC . H04L 63/0876; H04L 63/0236; H04L 63/20; H04L 63/08; H04L 63/1408; H04L 63/1433
See application file for complete search history.

(56) References Cited

U.S. PATENT DOCUMENTS

| | | | | |
|---|---|---|---|---|
| 2011/0225625 | A1* | 9/2011 | Wolfson | H04L 63/205 726/1 |
| 2015/0229664 | A1* | 8/2015 | Hawthorn | H04L 63/1433 726/25 |
| 2017/0099258 | A1* | 4/2017 | Joe | H04L 63/20 |
| 2017/0332238 | A1* | 11/2017 | Bansal | H04L 67/125 |
| 2019/0081961 | A1* | 3/2019 | Bansal | H04L 67/10 |

* cited by examiner

*Primary Examiner* — Ellen Tran
(74) *Attorney, Agent, or Firm* — Gray Ice Higdon

(57) ABSTRACT

Systems and methods for establishing a secure communication network are provided. For example, a risk mitigation computing device determine a first set of devices on an enhanced security communication network and a second set of devices on a home communication network. The risk assessment computer system may enable a first network connection between the first set of devices and a cloud-based node via the enhanced security communication network and may enable a second network connection between the second set of devices and an internet. The enhanced security communication network and the home communication network may be separate. The risk mitigation computing device may receive headers of data packets transmitted through the enhanced security communication network and correlate the headers of data packets with risk assessment indicators. The risk mitigation computing device may provide a risk score based on the risk assessment indicators correlated with the headers of data packets.

20 Claims, 15 Drawing Sheets

Indicators

Show [50 ▾] entries          Search: [ ]     [Add Ind]

| ID | Label | Description | Gain | Sub-indicators | Action |
|---|---|---|---|---|---|
| 6 | Protocol-Telnet Ingress | Are there telnet sessions connecting from outside your network to resources inside your network? | 1 | 1 | ✎ 🗑 |
| 39 | Anomaly Detection - DNS requests | Do any DNS requests appear to be an anomaly? | 1 | 2 | ✎ 🗑 |
| 42 | Anomaly Detection - FTP | Do any FTP flows appear to be an anomaly? | 1 | 2 | ✎ 🗑 |
| 41 | Anomaly Detection - RDP | Do any RDP flows appear to be an anomaly? | 1 | 2 | ✎ 🗑 |
| 40 | Anomaly Detection - SMB | Do any SMB flows appear to be an anomaly? | 1 | 2 | ✎ 🗑 |
| 43 | Anomaly Detection - SSL | Do any SSL flows appear to be an anomaly? | 1 | 2 | ✎ 🗑 |
| 37 | Anomaly Detection - HTTPS Ext | Does any external-bound HTTPS traffic appear to be an anomaly? | 1 | 2 | ✎ 🗑 |
| 7 | Anomaly Detection - HTTP | Does any HTTP traffic appear to be an anomaly? | 0.9 | 2 | ✎ 🗑 |
| 38 | Anomaly Detection - HTTPS Int | Does any internal HTTPS traffic appear to be an anomaly? | 1 | 2 | ✎ 🗑 |
| 36 | Anomaly Detection - HTTP Int | Does any internal HTTP traffic appear to be an anomaly? | 1 | 2 | ✎ 🗑 |
| 31 | Browser update - All | Does your organization have an effective browser update policy? | 1 | 4 | ✎ 🗑 |
| 32 | Chrome update | Does your organization have an effective chrome browser update policy? | 1 | 4 | ✎ 🗑 |
| 33 | Edge update | Does your organization have an effective IE/Edge browser update policy? | 1 | 4 | ✎ 🗑 |
| 30 | OS update policy | Does your organization have an effective OS update policy? | 1 | 4 | ✎ 🗑 |
| 29 | EoL OS - iOS | Does your organization have end of life iOS devices? | 1 | 2 | ✎ 🗑 |

610 ⎨ (rows 6, 39, 42, 41, 40, 43)
620 ⎨ (rows 37, 7)

FIG. 6

Edit Indicator

| | |
|---|---|
| Label | EoL OS - Windows  710 |
| Description | Does your organization have End of Life Windows OS machines? |
| Gain | 1 |

[Update] [Back]

Sub-Indicators

[Add Sub-Indicator]

| Label | Action |
|---|---|
| EoL OS - Windows - Limited | ☐ ☐ |
| EoL OS - Windows - Unacceptable | ☐ ☐ |

Rubrics

[Add Rubric]

| Sub-Indicator  720 | Description | EoL OS - Windows - Unacceptable | EoL OS - Windows - Limited |
|---|---|---|---|
| EoL OS - Windows - Unacceptable | Your Organization has an unacceptable level of EoL Windows OS machines | Yes | No |
| EoL OS - Windows - Limited | A limited of EOL Windows OS machines exist on your network | Yes | Yes |
| | | 10 | 7 |

FIG. 7

| | | | | | |
|---|---|---|---|---|---|
| ⊙ Dashboard | | | | | 800 |
| USERS | | | | | |
| ⚇ Users | | | | | |
| INDICATORS | | | | | |
| ⊞ Indicators | 31 | Browser update - All | Does your organization have an effective browser update policy? | 1 | 4 |
| | 32 | Chrome update | Does your organization have an effective chrome browser update policy? | 1 | 4 |
| | 33 | Edge update | Does your organization have an effective IE/Edge browser update policy? | 1 | 4 |
| ⊞ Sub-Indicators | 30 | OS update policy | Does your organization have an effective OS update policy? | 1 | 4 |
| | 29 | Eol OS - iOS | Does your organization have end of life iOS devices? | 1 | 2 |
| | 28 | Eol OS - Windows | Does your organization have end of life window OS machines? | 1 | 2 |
| ⊞ Indicators-Rubrics | 4 | Protocol - HTTP Internal | Does your organization host internal web-applications that do not support encryption of data-in-transit? | 0.8 | 5 |
| JOB ENGINE | | | | | |
| | 3 | Protocol - FTP Internal | Does your organization transfer files over FTP inside your network? | 0.7 | 1 |
| ⛁ Indicator jobs | 12 | Protocol - IPP | Does your organization use an insecure internet printing protocol? | 0.2 | 3 |
| ⊞ Sub-indicators jobs | 14 | Protocol - LDAP | Does your organization have an unencrypted LDAP protocol? | 0.1 | 3 |
| ORGANIZATIONS | 2 | Protocol - FTP host | Does your organization use FTP to provide access to files to users outside the organization? | 1 | 1 |
| ▤ Dashboard | 1 | Protocol - FTP use | Does your organization use FTP to transfer files to remote locations outside the organization? | 0.8 | 3 |

FIG. 8

| 34 | SSH usage | Does your organization use SSH? | 1 | 2 |
| 5 | Protocol - Telnet use | Does your organization use the telnet to manage devices? | 0.8 | 2 |
| 15 | Protocol - Rsync | Does your organization use the (potentially) insecure Rsync protocol? | 1 | 3 |
| 18 | Protocol - System logger | Does your organization use the (potentially) insecure system logger protocol? | 1 | 3 |
| 16 | Protocol - Git | Does your organization use the insecure git protocol? | 1 | 3 |
| 20 | Protocol - IMAP mail | Does your organization use the insecure IMAP mail protocol? | 0.2 | 3 |
| 21 | Protocol - POP mail | Does your organization use the insecure POP mail protocol? | 1 | 3 |
| 8 | Protocol - PPTP | Does your organization use the insecure PPTP protocol? | 1 | 3 |

FIG. 8 (Continued)

Operational Recommendations
Block access to know malware distribution IPs. Evaluate the resources needed to keep firewall rules up-to-date. Review the effectiveness of the current boundary protection security services (e.g. Firewalls) to eliminate access to suspicious websites and IPs.

⏱ Last seen: 2020-06-20 05:05:02

Protocol - HTTP Internal
Does your organization host internal web-applications that do not support encryption of data-in-transit?

Business Recommendations
Less than 50% of your internal applications enforce/use secure HTTP protocol. There is a risk to the confidentiality of your data by an insider who can act as a man-in-the-middle to copy all transferred files due to the use of an unsecured protocol. Make sure that your team enforces encryption on applications processing critical data.

Operational Recommendations
Identify all internal web applications, classify their criticality, and enforce HTTPs on critical applications.

⏱ Last seen: 2020-06-29 05:00:07

Edge update
Does your organization have an effective IE/Edge browser update policy?

Business Recommendations

Operational Recommendations

FIG. 11

SELECTIVE AUTHENTICATION OF NETWORK DEVICES

CROSS-REFERENCE TO RELATED APPLICATIONS

This application is a non-provisional patent application of U.S. Patent Application No. 63/068,953, filed on Aug. 21, 2020, the entire contents of which are incorporated herein by reference in its entirety for all purposes.

BACKGROUND

Working from home has gone from perk to business necessity. Whether by choice or by need, working outside the office results in inherently weaker network security for business activities. When your employee connects to a work laptop to a home network, the company's cyber risk profile rises exponentially. Home networks are characterized by weak passwords, poorly secured home Wi-Fi routers, insecure IoT/personal devices, and any number of household members who may unwittingly allow bad actors into the corporate network.

The most common threats to home networks are malware attacks and man-in-the middle attacks. In the case of malware, approximately 33% of household computers (and thus home networks) are already infected by some type of malware. Malware typically infects a device, stealing sensitive personal or corporate data or in the case of ransomware, hold your computer or personal and financial data "hostage" for a ransom. Worse still, cybercriminals use sophisticated social engineering and spear phishing to target you and your executive team into installing malware giving a third-party remote access to your device, directly or indirectly through a family member sharing the same home network. Man-in-the-middle attacks are cybersecurity attacks that allow the attacker to eavesdrop on communication between two targets, for example communication between the laptop of your employee at home and the corporate server. Allowing your employees to access the corporate network from home makes your company network as insecure as the least robust home Wi-Fi used to access it. Home networks may be characterized by weak passwords, poorly secured home Wi-Fi routers, insecure IoT/personal devices and any number of household members who may unwittingly allow bad actors into your corporate network.

Additionally, when multiple devices are on a shared network, only one device would need to become infected with malicious software for the infection to spread to other devices on the shared network. Malware is commonly configured to propagate to other devices on the shared network. When one of those devices is on two separate networks, the malware may infect devices on both networks.

While most companies use a VPN to secure online connections and protect data transmission from man-in-the-middle attacks over the internet, VPNs cannot protect the corporate laptop on the vulnerable home network nor prevent malware from infecting the company device.

Better security solutions are needed to reduce risk in distributed computing environments.

SUMMARY

To help address the critical risks of both mandated and voluntary work from home events, a computing device is described herein. The computing device may provide router capabilities. The computing device can install in less than five minutes by any employee regardless of technology skills on their home network, creating a secure network segment that is "always on, always secure", making it simple easy to use. When the employee's laptop is connected to the computing device, it benefits from advanced firewall protection, remote threat blocking, and an artificial intelligence (AI) enabled risk monitoring service. Any home activity outside the network associated with the computing device, for example that of other family members on various personal devices, is not monitored and is 100% private.

The computing device may be incorporated with a corporate network and physically located within a proximity of a home network. This can allow users to work remotely just like they were at the office.

The computing device may provide network segmentation of remote employee work activities from unsecure home networks that are built on highly vulnerable consumer-grade hardware and host a multitude of unsophisticated users (children, extended family, guests, etc.) and a multitude of unpatched, unsecure, "smart home", IoT, and other personal devices which are potential stepping stones to a work device.

The computing device may provide VPN tunneling from a secure network segment that protects communication on the LAN, through an employee's unsecure home network and vulnerable home router to the internet providing secure communication. A secure connection into the corporate LAN or multiple corporate LANs is also available. Often this occurs through ISP-supplied home routers, which are less secure than already vulnerable consumer offerings. In some examples, the ISP internet connection may be a cable, fiber, DSL, LTE, 5G, etc.

The computing device may have the ability to switch VPN routes. Each of the VPN routes may correspond with different corporate/business connections. For example, the computing device may change the VPN route from a first computing device to a second computing device (e.g., the node to the intended destination, etc.). The ability to switch VPN routes can be manual or automated based on one or more switching processes (e.g., artificial intelligence (AI) or trained machine learning (ML) model, etc.). The switching process may move from one node to another node based on various metrics, including processing capacity available after other applications are executed, the data required to run the VPN on the node, or a sensitivity value of the data being accessed.

The computing device may provide a secure baseline configuration across a work environment for home users enabled with various authentication processes. For example, the home user may be authenticated with multi-factor authentication (e.g., an authentication process that requires more than one form of confirmation of identity, including password and an electronic communication to a known device, etc.) and/or biometric authentication. The authentication process may help to ensure that the segmented business network usage, VPN access, addition of devices and unwelcome guest users via Wi-Fi or ethernet connections are vetted locally by home user or remotely by corporate IT team.

The computing device may provide continued risk assessment of the segmented home network using advanced AI, which can provide greater visibility into everything happening on a company network, raise awareness to and reduce attack surface of potential cyber risks in advance of threats being able to set foothold on your expanded corporate network.

The computing device can reduce interactions between work from home users and the corporate IT team. It can be implemented at scale, installed without having to travel and can be then managed by the corporate IT department. The computing device may establish a segmented home network using a computing device that can be shipped to an employee's home to deliver data security and peace of mind. The computing device may also be included as part of the ISP's router either physically separated (an add-on unit) or logically separated (a combination of software and hardware logically separated) from the main router.

The computing device may also address the 5G needs for improved cybersecurity. For example, 5G may replace a current delivery of internet to a household (e.g., wired cable or fiber optics connections, etc.). This may include incorporating a 5G wireless connection in a home network, so the vast majority of us may access the 5G network via mobile devices of the home network. However, tapping into 5G's capabilities over a fixed wireless connection could make it a viable home internet option along with cable and fiber-optic services.

5G networks may provide higher bandwidth and lower latency communication, which can enable a large number of new applications with better and higher quality of service. This also comes with many challenges, including cybersecurity, since 5G can connect billions of IoT devices to the Internet. Some of these devices are known for poor security posture. 5G can also enable new applications in tele-medicine and remote patient monitoring which also heavily depend on IoT devices. To achieve the maximum potential of 5G, cybersecurity can be implemented as a cornerstone in any 5G architecture or application. Preventive measures may be put in place to prevent the threats IoT devices can pose to other business devices on the same local network. There is also a great need to capture risk assessment indicators and mitigate the risk source before it is too late and they turn into incidents.

In some examples, the computing device may be implemented alongside or within current critical internet connected infrastructure or devices and future critical 5G infrastructure or devices like 5G applications in IoT, self-driving cars, and/or 5G in healthcare (robotic surgery). The computing device may become part of a fixed broadband replacement product, providing consumers with faster electronic communication speeds than most existing cable and DSL connections from ISPs today with increased security.

In some examples, the computing device can deliver data security to other locations outside of a home network (e.g., via 5G). For example, the computing device can generate a secure segmented network for performing a robotic surgery, where the computing device generates a secure network for the robotic surgery within a less secure network provided by a hospital or the like. The computing device may provide VPN tunneling that protects communications between the robot at a first location and an operating user at a second location on the LAN, through a hospital's less secure network and vulnerable router to the internet, providing secure communication that is also located at the first location with the robot.

In another example, the computing device can generate a secure segmented network for remote operation of vehicles (e.g., mining trucks, etc.), where the computing device generates a secure network between the vehicle and an operating user within a less secure network provided at either location.

In another example, the computing device can generate a secure segmented network for an automated teller machine (ATM) machine, where the computing device generates a secure network between the ATM and a backend computing system that manages user accounts. The ATM machine may be located in a mall with a less secure WiFi connection, but any communications between the ATM machine and the backend computing system may be transmitted via the secure network enabled by the computing device.

In another example, the computing device can generate a secure segmented network for a remote sensing and control application (e.g., oil or gas pump, etc.). These and other examples are provided for illustrative purposes and should not be used to limit the disclosure.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 6 is an interface of risk assessment indicators, in accordance with the embodiments disclosed herein.

FIG. 7 is an interface of sub-indicators for a risk assessment indicator, in accordance with the embodiments disclosed herein.

FIG. 8 is an interface of risk assessment indicators, in accordance with the embodiments disclosed herein.

FIG. 11 is an interface for providing recommendations based on a risk assessment, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description covers particular embodiments of the application, set out to enable one to practice an implementation of the embodiments, and is not intended to limit the preferred embodiment, but to serve as particular examples thereof. Those skilled in the art should appreciate that they may readily use the conception and specific embodiments disclosed as a basis for modifying or designing other methods and systems for carrying out the same purposes of the embodiments. Those skilled in the art should also realize that such equivalent assemblies do not depart from the spirit and scope of the invention in its broadest form.

In accordance with some embodiments of the application, systems and methods are configured to implement a secure segmented network at a first location (e.g., home, remote, etc.).

Figure 1:
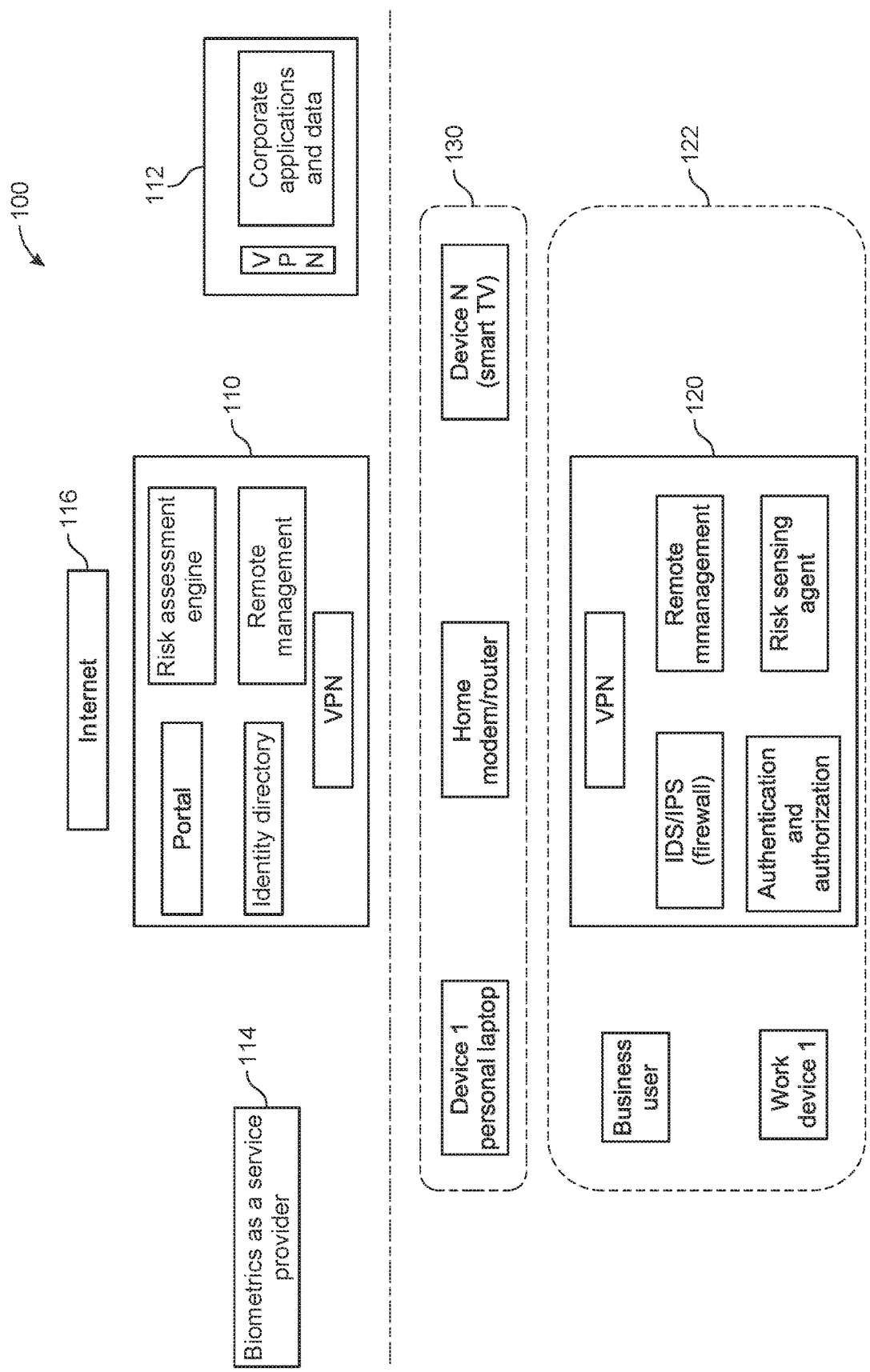
FIG. 1 illustrates a distributed computer system, in accordance with some embodiments of the application.

FIG. 1 illustrates a distributed computer system, in accordance with some embodiments of the application. In illustration 100, risk assessment computer system 110, corporate computer system 112, biometrics as a service provider 114, and internet 116 are located remotely from home network 130 and risk mitigation computing device 120 in enhanced security network 122. Home network 130 may comprise one or more personal computing devices, a home router, and one or more personal smart devices (e.g., internet enabled refrigerator or smart TV, etc.). Enhanced security network 122 may comprise risk mitigation computing device 120 and one or more mobile work devices.

Risk assessment computer system 110 includes processor, memory with computer executable instructions embedded thereon, and a plurality of engines, including portal, identity directory, risk assessment engine, remote management engine, and a VPN connector. Risk assessment computer system 110 may be in communication with risk mitigation computing device 120 via communication network to internet 116 accessible via home router on home network 130.

Risk assessment computer system 110 may comprise a cloud-based node that is capable of acting as both VPN endpoint to IoT devices (e.g., commercial-grade router, etc.) and corresponding master computing device that can include an IT automation engine that automates cloud provisioning, configuration management, application deployment, intra-service orchestration, and many other IT needs. Risk assessment computer system 110 may support several risk mitigation computing device 120 in a master to minion relationship.

Risk assessment computer system 110 may implement a risk assessment engine. The risk assessment engine may be custom-built system to sense, collect, analyze, score, and aggregate risk assessment indicators.

Risk assessment computer system 110 may implement remote management of risk mitigation computing device 120 via a communication network.

Risk assessment computer system 110 may comprise a portal. The portal may provide an end-user view of connection status through a web browser or a mobile app. The portal may also provide a corporate administrator view to review connection status and risk ratings across all their users. The portal may enable some self-serve functionalities as well, including changing Wi-Fi password, adding new devices, etc.

Risk assessment computer system 110 may comprise an identity directory. The directory service may comprise a database or other data store of all users with their different attributions. The identity directory may interface with biometrics as a service provider 114 that works an authentication service.

Risk assessment computer system 110 may generate a VPN at the gateway. This may include at the router hardware versus at the client in the form of software on each device that needs to connect back to a corporate network. This may increase the solution's usability for setting up a laptop, tablet, phone, and a printer securely on the corporate VPN that can be as easy as connecting them.

Risk assessment computer system 110 may require authentication of all devices joining the secure network. The authentication process may request a biometric authentication, two-factor or multi-factor authentication, and the like. Other types of authentication may be implemented without diverting from the scope of the disclosure.

Risk assessment computer system 110 may require ongoing user identity monitoring to ensure "perpetual" authentication.

Risk assessment computer system 110 may perform ongoing continuous risk monitoring to proactively address cyber risks before they become imminent. For example, a scan may be initiated by risk assessment computer system 110 to be performed on one or more devices connected to the gateway. The scan may determine vulnerabilities of the device (e.g., old software versions that have not been updated or patched, unsecure network segments that do not require authentication, etc.). Additional software may not be embedded on the connected devices to perform these scans.

Risk assessment computer system 110 may restrict access to one or more physical ports. In some examples, risk mitigation computing device 120 may communicate with risk assessment computer system 110 using a predefined or preconfigured port. Access to other physical ports may be restricted for improved security and reduced vulnerabilities. For example, ports may be open temporarily for improved security, which can also reduce vulnerabilities. In some examples, communications may be initiated by the device to the cloud, which can reduce the need for continually open ports.

Risk assessment computer system 110 may initiate additional electronic communications with risk mitigation computing device 120, whereas risk mitigation computing device 120 may be limited to initiating communications with risk assessment computer system 110 through the portal. The portal may provide an end-user view of connection status through a web browser or a mobile app.

These and other operations may be performed without human IT user setup or error for a device that sits behind a NAT (Network address translation) that would otherwise be unreachable to configure and manage. The operations may be performed without storing sensitive user data.

Risk mitigation computing device 120 includes one or more computer processors, one or more computer readable storage media for storing with computer executable instructions, and a plurality of engines, including IDS/IPS firewall, remote management engine, authentication and authorization engine, risk sensing engine, and a VPN connector. Risk mitigation computing device 120 may be in communication with risk assessment computer system 110 via communication network to internet 116 accessible via home router on home network 130.

Risk mitigation computing device 120 may comprise a commercial-grade, pre-configured, wireless router with intrusion detection/intrusion prevention capabilities. Risk mitigation computing device 120 may be delivered to a first location (e.g., home environment) that is remote from risk assessment computer system 110. Risk mitigation computing device 120 may be preconfigured (e.g., by running a pre-configuration routine, etc.) to provide a secure communication network with a home network (e.g., enhanced security network 122 provided with home network 130). The segmented networks may be provided concurrently at a first location (e.g., home, remote, etc.) of the user. Enhanced security network 122 may be generated at scale, using automation and orchestration enabled by risk mitigation computing device 120 in a preconfigured format and in concert with risk assessment computer system 110.

Risk mitigation computing device 120 may solve several issues with standard network implementations performed by computing devices. For example, traditional computing devices may run binary executables (e.g., deep packet inspection (DPI), orchestration, remote management, network segregation or segmentation, etc.) on a remote IoT device (e.g., commercial-grade router, etc.) that makes excessive use of non-persistent storage during firmware updates and reboot sequences. The use of non-persistent storage is desirable so every time the router reboots, it starts from a clean, secure, and known state. This can make sure to kill any persistent malware on the router.

Risk mitigation computing device 120 may use non-persistent storage. Risk mitigation computing device 120 may restrict the use of persistent software by deleting the persistent software in a next reboot cycle or software upgrade. Risk mitigation computing device 120 may implement stock firmware and limit any additional software or data from being stored on the computing device (e.g., to enhance security and mitigate risk of storing malware, etc.). Risk mitigation computing device 120 may be configured to generate a virtual private network (VPN) during a pre-configuration routine. The VPN may create a secure path back to risk assessment computer system 110 or other cloud instance (for management traffic). The VPN can also be used to route user traffic securely to corporate computer system 112 or to internet 116 through a cloud instance.

Risk mitigation computing device 120 may implement a risk sensing agent. The risk sensing agent may comprise a custom-built Deep Packet Inspection (DPI) engine for data processing that inspects in detail the data being sent over a computer network. The risk sensing agent may perform blocking, re-routing, or logging to the data. The risk sensing agent may be configured to sense packet headers and forward relevant info to risk assessment computer system 110 to be consumed by the risk assessment engine implemented by risk assessment computer system 110.

Risk mitigation computing device 120 may implement an authentication and authorization engine. For example, risk mitigation computing device 120 may be configured to implement Remote Authentication Dial-In User Service (RADIUS) networking protocol, operating on port 1812, that provides centralized Authentication, Authorization, and Accounting management for users who connect and use a network service. The authentication and authorization engine may allow or block devices based on the authentication decision (i.e. new devices need to be authenticated by the user using an authentication process described herein) or the increase in risk level. In some examples, the RADIUS protocol may be replaced by a custom-built event processor (software) that provides authentication, authorization, and accounting management for users and their devices.

Risk mitigation computing device 120 provides a more productive user experience versus alternative user experiences provided by other computing devices. For example, employee users may benefit from no performance lags with access to work-approved printers, scanners, and mobile systems. This may help the secured network avoid risky employee workarounds in getting work done that typically would exponentially increase risk for the organization.

Risk mitigation computing device 120 provides an "always on, always secure" mode that may require no instruction, routine, or education of employees for its use, which may otherwise reduce the efficacy of the cyber security solutions described herein.

Biometrics as a service provider 114 may provide an authentication process. For example, biometrics as a service provider 114 may request information from risk mitigation computing device 120 and/or identity directory implemented by risk assessment computer system 110. This may include receiving a request to authenticate a new user device on the network. When the user device previously accessed the network, biometrics as a service provider 114 may remotely invoke a biometrics authentication for a pre-registered user. If allowed, biometrics as a service provider 114 may send a message to risk mitigation computing device 120 to allow this device on the network.

Various actions may be performed with the system illustrated in FIG. 1. A sample process flow of implementing a pre-configuration routine (e.g., via a script, algorithm, software, computer-implemented method, etc.) is described herein:

Step 1—Deploy cloud-based nodes capable of acting as both VPN endpoints to IoT devices (e.g., minions) and masters. Each node can support a plurality of minion IoT devices, for example, up to 254 minions, etc.

Step 2—Establish a persistent tunnel from a designated node using a protocol supported in the IoT's controller to one or more minions using a virtual private network (VPN) system or other secure tunnel technologies. The IoT's controller may correspond with a cloud-based application that delivers security and control features on a remote, service-level basis. The nodes may be authenticated to each other using pre-shared secret keys, certificates, or other authentication processes (e.g., username/password, etc.).

Step 3—Use a VPN to create a Secure Shell Protocol (SSH) connection 'on-demand' to the minion.

Step 4—Invoke one or more automation scripts to transmit binaries and supporting configuration in a 'just in time' fashion to the IoT device.

Step 5—Establish a connection into VPN status (up/down) to trigger Step 4 anytime a change takes place, ensuring target software is always running.

Step 6—Deploy a global master to issue commands to nodes acting as intermediaries for things like triggering software updates, passphrase changes, black/white lists, global configurations, etc.

These steps of the pre-configuration routine are provided for illustrative purposes. The order in which the steps are presented shall not mandate that various embodiments be implemented to perform the recited functionality in the same order.

As used herein, the terms logical circuit and engine might describe a given unit of functionality that can be performed in accordance with one or more embodiments of the technology disclosed herein. Each of the logical circuits or engines might be implemented utilizing any form of hardware, software, or a combination thereof. In some examples, the logical circuits and engines described herein can be implemented as a stand-alone device, add-on device, or logically separated built-in within the ISP's internet gateway.

As used herein, one or more processors, controllers, ASICs, PLAs, PALs, CPLDs, FPGAs, logical components, software routines, or other mechanisms might be implemented to make up an engine. In some embodiments, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Figure 2:
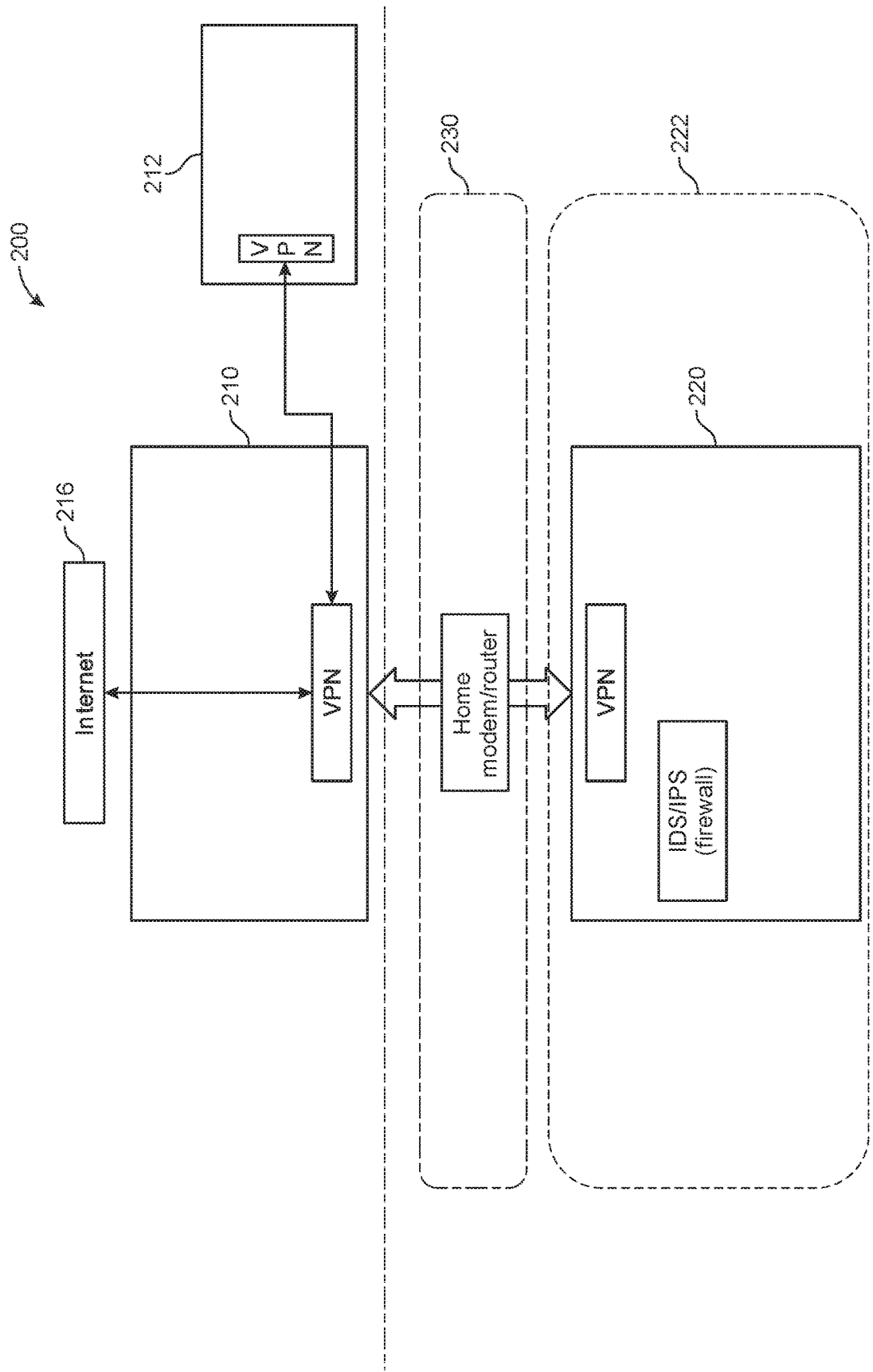
FIG. 2 is an illustrative flow for establishing internet access, in accordance with the embodiments disclosed herein.

FIG. 2 is an illustrative flow for establishing internet access, in accordance with the embodiments disclosed herein. In illustration 200, risk assessment computer system 210, corporate computer system 212, and internet 216 are located remotely from home network 230 and risk mitigation computing device 220 in enhanced security network 222. Risk assessment computer system 210, corporate computer system 212, internet 216, home network 230, risk mitigation computing device 220, and enhanced security network 222 of FIG. 2 may be similar to risk assessment computer system 110, corporate computer system 112, internet 116, home network 130, risk mitigation computing device 120, and enhanced security network 122 of FIG. 1.

Devices in enhanced security network 222 and home network 230 may enable internet access via a router by an internet service provider (ISP). The router on home network 230 may be placed physically next to risk mitigation computing device 220 on enhanced security network 222, but may provide logically different networks through a same connection point to the ISP. Any data that goes through enhanced security network 222 may transfer via a VPN connection portal at risk mitigation computing device 220 to a VPN connection portal at risk assessment computer system 210. The VPN may further offer connections to internet 216 or corporate computer system 212, which provides access to the user accessing enhanced security network 222 to internet 216 and corporate computer system 212. If the router is compromised the secured data transferred in enhanced security network 222 is not also compromised.

Risk mitigation computing device 220 may provide VPN tunneling from enhanced security network 222 that protects communication on the LAN, through an employee's unsecure home network 230 and vulnerable home router to the internet providing secure communication. A secure connection into the corporate LAN is also available.

Figure 3:
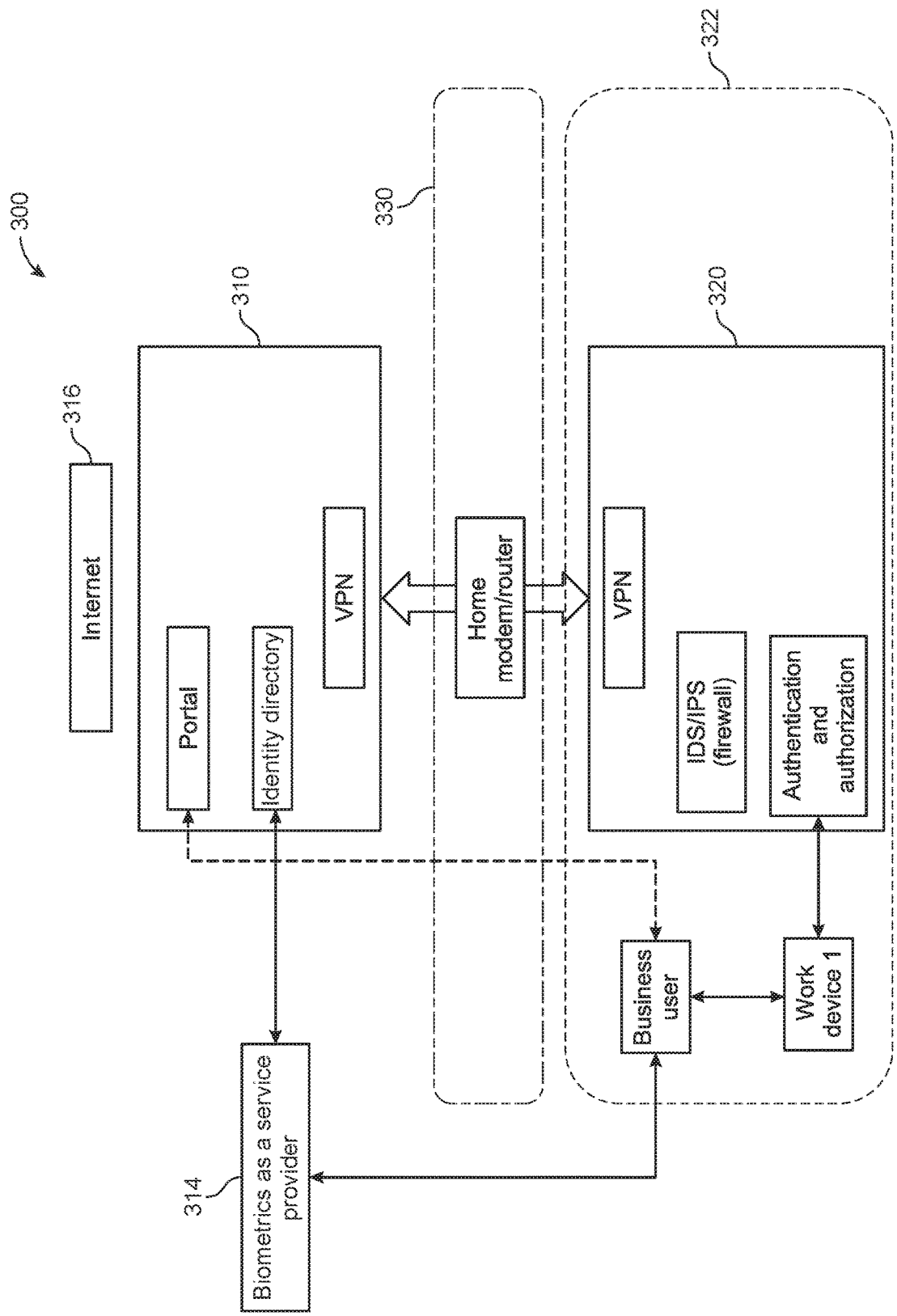
FIG. 3 is an illustrative flow for implementing user authentication, in accordance with the embodiments disclosed herein.

FIG. 3 is an illustrative flow for implementing user authentication, in accordance with the embodiments disclosed herein. In illustration 300, risk assessment computer system 310, biometrics as a service provider 314, and internet 316 are located remotely from home network 330 and risk mitigation computing device 320 in enhanced security network 322. Risk assessment computer system 310, biometrics as a service provider 314, internet 316, home network 330, risk mitigation computing device 320, and enhanced security network 322 of FIG. 3 may be similar to risk assessment computer system 110, corporate computer system 112, internet 116, home network 130, risk mitigation computing device 120, and enhanced security network 122 of FIG. 1.

Upon an initial connection, the user device may be authenticated prior to accessing data. Authentication and authorization engine implemented at risk mitigation computing device 320 may be called as a local service. Once called, the authentication and authorization engine may query the identity directory from risk assessment computer system 310 via the established VPN connection. When the identity of the user device is found in the identity director, the user device may be authenticated.

When the identity is not found in the identity directory, risk assessment computer system 310 may call biometrics as a service provider 314 to initiate a new authentication process. Biometrics as a service provider 314 may transmit an authentication request to the user device that adjusts an interface of the user device. In some examples, the interface may collect a biometric attribute of the user and transmit the biometric attribute back to biometrics as a service provider 314 to perform the authentication. The biometric attribute may be stored and compared at biometrics as a service provider 314. In other examples, the interface may perform a two-factor or multi-factor authentication and/or request a username/password to authenticate the user without diverting from the essence of the disclosure.

An initial authentication process may be performed (e.g., virtual identity proofing). For example, when a user first receives risk mitigation computing device 320, the initial identity of the user may be exchanged with risk assessment computer system 310. The user may provide identity remotely by uploading a picture or taking a picture in real time using a camera provided by a user device. In some examples, both risk mitigation computing device 320 and risk assessment computer system 310 may receive pictures of the user and compare the pictures using an image recognition process. In some examples, the user may upload an image of their driver's license and establish an identity. Once the identity is established, using remote management, risk assessment computer system 310 may deploy software to risk mitigation computing device 320 to correlate a single identity with the device.

In some examples, risk mitigation computing device 320 in enhanced security network 322 may be initially plugged in. Once connected, the remote management software installed on risk mitigation computing device 320 will ping risk assessment computer system 310. The pinging may be performed without any interaction with the user. The remote control from remote management may connect via the VPN. Then, risk assessment computer system 310 may install a software risk sensing agent at risk mitigation computing device 320 and update some configuration settings to associate the risk sensing agent specifically to this user.

In some examples, the user may be prompted on a second user device (e.g., mobile phone, etc.) to register for an authentication application that is configured to receive authentication values (e.g., username, password, personal computing device identifier, phone number, biometrics, or other identifying attributes). When the user attempts to access the enhanced security network 322 via a new device, the authentication application may trigger activation at the second user device. The authentication process may provide an authentication question or query to confirm that the user approves of adding a new device to enhanced security network 322. When the authentication application receives a positive response, the new device may be registered to a particular portal.

On a going basis, an event may trigger a risk assessment of enhanced security network 322, including access to the firewall or a device attempting to scan the network. These and other events may increase a risk score of the network. A notification may be sent to the second user device or the risk engine associated with risk mitigation computing device 320. In some examples, the risk assessment may be automatically triggered in accordance with a predetermined time (e.g., every 24 hours). In some examples, the risk score exceeding a risk threshold may automatically disconnect the device and send a new biometric notification to the second user device.

Figure 4:
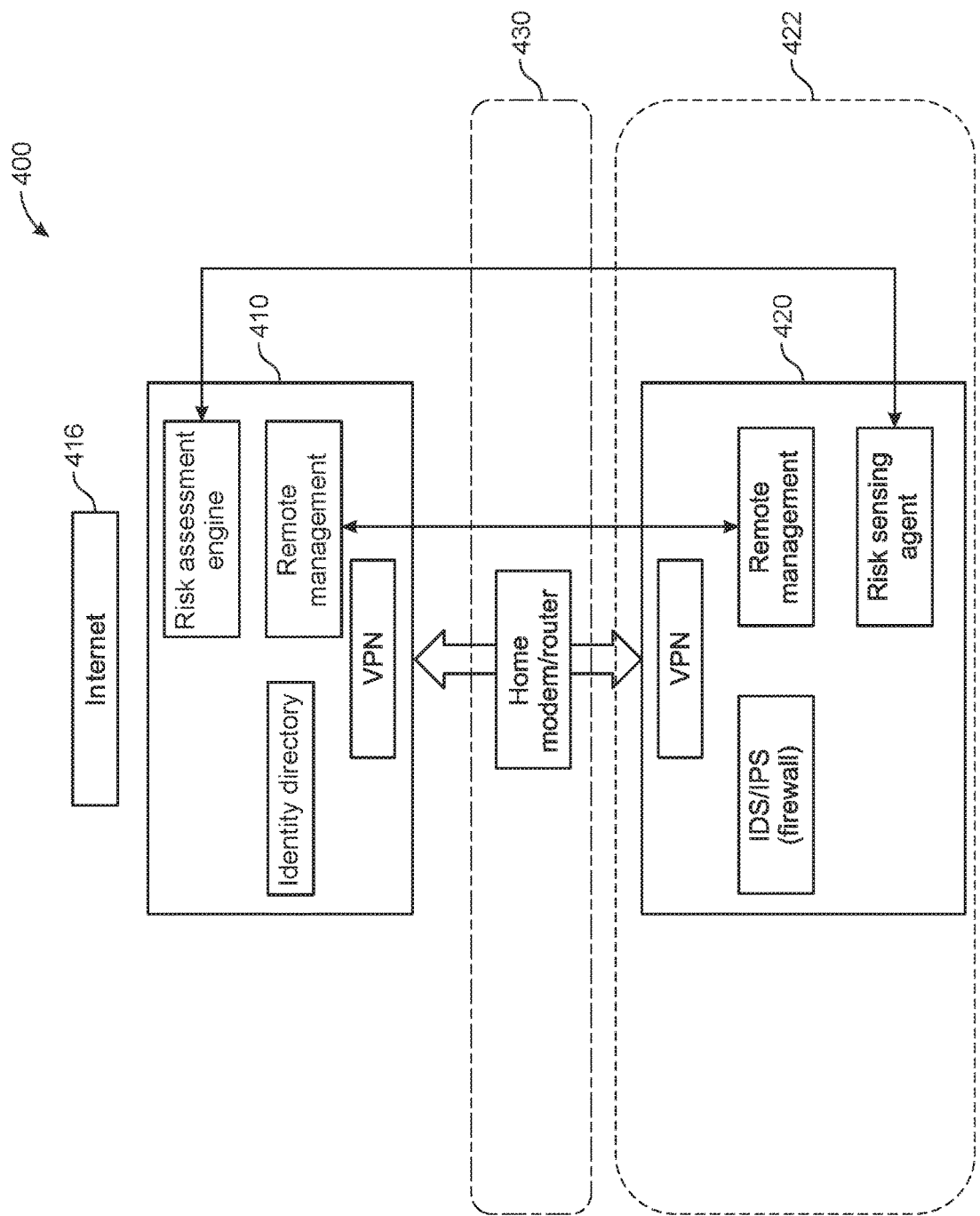
FIG. 4 is an illustrative flow for triggering a risk assessment, in accordance with the embodiments disclosed herein.

FIG. 4 is an illustrative flow for triggering a risk assessment, in accordance with the embodiments disclosed herein. In illustration 400, a segmented home network is provided. For example, risk assessment computer system 410 and internet 416 are located remotely from home network 430 and risk mitigation computing device 420 in enhanced security network 422. Risk assessment computer system 410, internet 416, home network 430, risk mitigation computing device 420, and enhanced security network 422 of FIG. 4 may be similar to risk assessment computer system 110, internet 116, home network 130, risk mitigation computing device 120, and enhanced security network 122 of FIG. 1.

The remote management software installed on risk mitigation computing device 420 may ping a corresponding remote management software on risk assessment computer system 410. The pinging may be performed without any interaction with the user. The remote control from remote management may connect via the VPN. Then, risk assessment computer system 410 may install a software risk sensing agent at risk mitigation computing device 420 and update some configuration settings to associate the risk sensing agent specifically to this user. The user may also be authenticated, as discussed herein.

Figure 5:
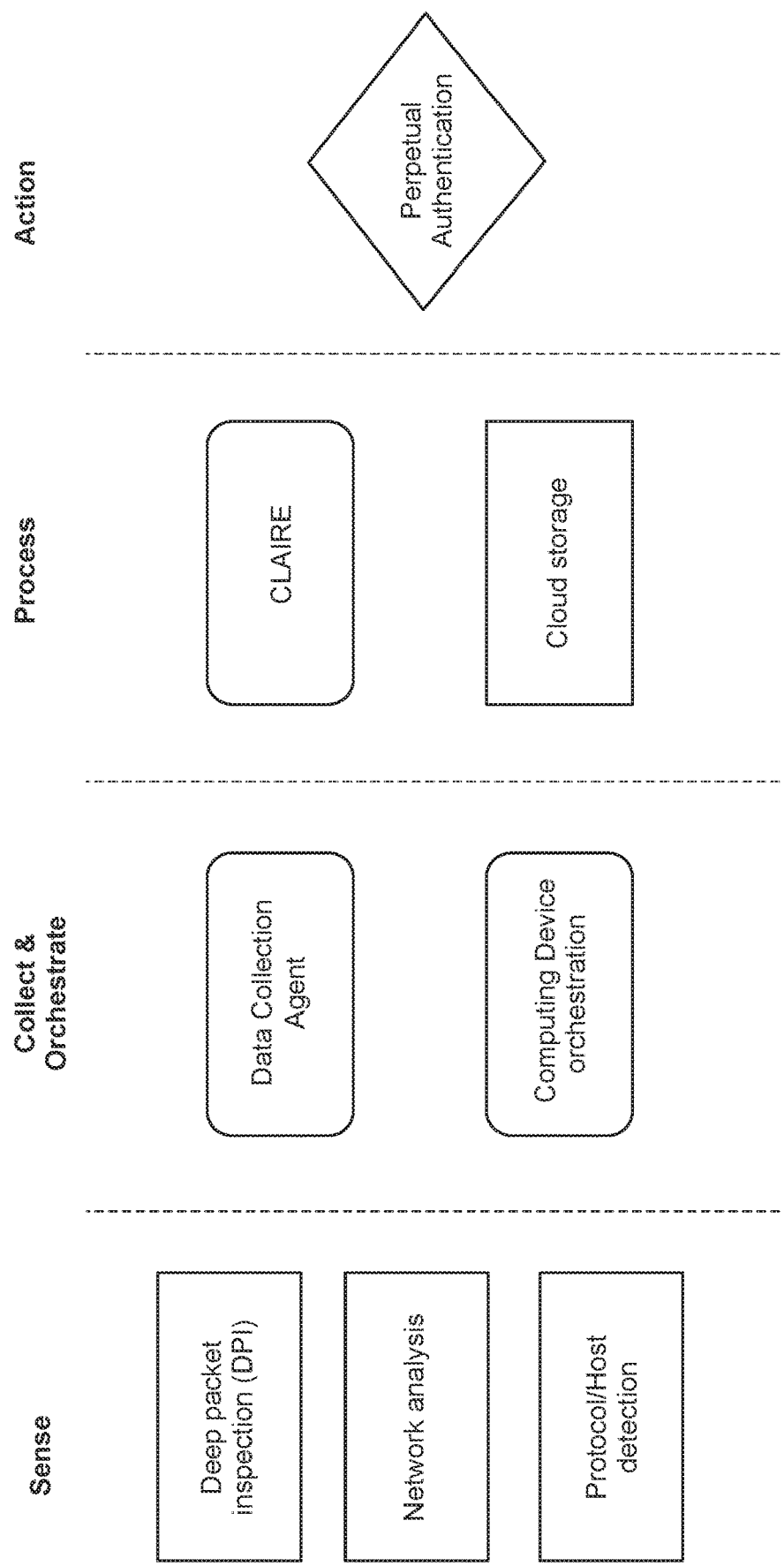
FIG. 5 is an illustrative flow of a risk assessment, in accordance with the embodiments disclosed herein.

Once installed and authenticated, the remote management software installed on risk mitigation computing device 420 and the corresponding remote management software on risk assessment computer system 410 may cooperatively scan network traffic, as illustrated in FIG. 5 as "sense." The scanned network traffic may be analyzed to assess risks in the secure network segment that protects communication on the LAN, through the employee's unsecure home network and vulnerable home router to the internet providing secure communication.

When a potentially risky event occurs on the secure network segment, remote management software on risk assessment computer system 410 may generate a notification to identify the potentially risky event and transmit the notification to a device of the user associated with the risk mitigation computing device 420.

When the potentially risky event is associated with a risk score above a risk threshold, one or more devices connected to the secure network segment provided by risk mitigation computing device 420 may be disconnected from the secure network segment. To reconnect the devices to the network, risk assessment computer system 410 may identify these disconnected devices in the identity directory and transmit a reauthentication request to the device or may require reauthentication via corporate computer system 112 in FIG. 1. The device may initiate an authentication routine, as discussed with FIG. 3.

The identity directory may also comprise a user profile associated with the one or more devices connected to the secure network segment provided by risk mitigation computing device 420. The user profile may comprise a risk score that is adjusted with each risk indication. For example, the risk score may be incremented with each risk event and decremented in association with a time period passing without a risk event occurring. Other embodiments of adjusting the risk score should be within the scope of the disclosure.

The risk score may be limited to a time frame. For example, the adjusted risk score within a time period may be compared with a risk threshold. In some examples, the user may be deactivated from the network when an accumulation of points associated with the risk score reach a certain point.

The risk threshold may correspond with an access level of the user. For example, when the access level of the user is relatively high (e.g., in an accessibility score range), the user may have access to a large amount of data provided by the secure network segment provided by risk mitigation computing device 420, and when the access level of the user is relatively low, the user may have less access to that data. The risk threshold may correspond with the access level of each user. For example, the user with the greater access to data may trigger a risk alert sooner than the user with less access to data.

The risk sensing agent on risk mitigation computing device 420 may collect packet headers of data packet transmitted through the VPN tunneling from the secure network segment, as illustrated in FIG. 5 as "collect and orchestrate." Attributes from the packet headers may be identified without identifying data in the data packet. This limited amount of data collected from data packets may help ensure data privacy of user data is maintained while helping to mitigate security risks to the system overall.

The attributes may include, for example, a source that transmitted the data packet, a destination that will receive the data packet, network information, protocol detection information, protocol deep packet inspection (DPI) information, application detection information, device discovery information, geolocation, and/or agent information.

Network information may include, for example, IP version, IP protocol, MAC or IP address of the local area network (LAN) device, TCP or UDP port of the LAN device, total number of packets or data, and the like. In some examples, the value of the field may include "0" if the field is not applicable (e.g. non TCP/UDP traffic).

Protocol detection information may include an identification of a software client for uploading/downloading files associated with the protocol data, a protocol category, and protocol detection quality. In some examples, the protocol category may include, for example, File Sharing, Infrastructure, VPN, etc.

Protocol DPI information may include, for example, a hash value to codify the identification of the software client for uploading/downloading files, DHCP data (e.g., device fingerprinting identifier, DHCP class, host name, etc.), DNS data (e.g., host name extracted from DNS traffic, etc.), HTTP data (e.g., user agent or host name extracted from HTTP traffic, etc.), mDNS data (e.g., service discovery protocol data extracted from mDNS traffic, etc.), NTP data (e.g., host name extracted from NTP traffic, etc.), SSH data (e.g., SSL client/server or host name extracted from SSH data, etc.), SSL data (e.g., SSL certificate common name or SNI host name extracted from SSL traffic, etc.), QUIC data (e.g., host name extracted from QUIC traffic, etc.), Windows® networking data (e.g., host name extracted from NetBIOS traffic, etc.), web proxy data (e.g., host name extracted from web proxy traffic, etc.), and the like.

Application detection information may include, for example, an application tag and/or category that can identify the application associated with the network traffic.

Device discovery information may correspond with auto-discovery or may be user-defined. The device discovery information may include, for example, a device identifier, operating system, device type (e.g., mobile, etc.), group identifier, and the like.

Agent information may include, for example, a unique identifier for an organization or site, a geolocation identifier, country or city location, agent identifier, interface identifier, interface type, and the like.

The attributes from the packet headers may be saved in cloud storage so that risk mitigation computing device 420 and risk assessment computer system 410 can access the data. The risk sensing agent may perform logging of the data. The risk sensing agent may be configured to sense packet headers and forward relevant info to risk assessment computer system 410 to be consumed by the risk assessment engine implemented by risk assessment computer system 410. The attributes from the packet headers may be processed, as illustrated in FIG. 5 as "process."

Using the attributes from the packet headers, the risk assessment engine on risk assessment computer system 410 can identify which risk assessment indicators are present in the network traffic.

Potential risk assessment indicators are illustrated in FIG. 6. For example, various queries may be posed for identifying the risk in the network traffic. The queries may be grouped by category, including protocol (e.g., telnet ingress, etc.), anomaly detection (e.g., DNS requests, FTP, RDP, SMB, SSL, HTTP/HTTPS, etc.), security policies (e.g., browser update, operating system, etc.), device detection (e.g., end of life device, etc.), and the like. Each category may be associated with one or more queries, including "are there Telnet sessions connecting from outside your network to resources inside your network," "do any DNS requests appear to be an anomaly," "do any FTP flows appear to be an anomaly," "do any RDP flows appear to be an anomaly," "do any SMB flows appear to be an anomaly," "do any SSL flows appear to be an anomaly," "does any external-bound HTTPS traffic appear to be an anomaly," "does any HTTP traffic appear to be an anomaly," "does any internal HTTPS traffic appear to be an anomaly," "does any internal HTTP traffic appear to be an anomaly," "does your organization have an effective Chrome® browser update policy," "does your organization have an effective IE/Edge® browser update policy," "does your organization have an effective OS update policy," "does your organization have end of life iOS devices," and the like.

The risk assessment engine implemented by risk assessment computer system 410 may collect the potential risk assessment indicators and data packet headers from the cloud storage to search for specific patterns using analytics.

An illustrative sample rubric of scoring a risk indicator is illustrated with FIG. 7. In illustration 700, risk indicator 710 includes "Does your Organization have End of Life Windows® OS machines?" Sub-indicators 720 may be included with each risk indicator. In this illustration, sub-indicators 720 include "your organization has an unacceptable of level of EOL Windows® OS machines" and "a limited number of EOL Windows® OS machines exist on your network." These sub-indicators may correspond with software instructions that query the data stored in the database to return a Yes or No answer.

When risk indicator 710 is selected, the risk assessment engine implemented by risk assessment computer system 410 may execute the software instructions associated with each of the corresponding sub-indicators 720. The output from the executed software instructions (e.g., binary 0/1 or yes/no, etc.) may be compared with a rubric to determine a score for each of sub-indicators 720.

In some examples, the output from the executed software instructions may be compared with a threshold. For example, the software instructions can determine the data corresponding with the sub-indicator and compare the data with a threshold for the sub-indicator. When the data exceeds the threshold (e.g., 10%), the data corresponding with the sub-indicator may be greater than the threshold and the executed software instructions may determine the output for the sub-indicator based on the data exceeding the threshold (e.g., yes or no, etc.).

The scores may be aggregated to determine a total score for risk indicator 710. For example, when the output for each sub-indicator is "yes," the aggregation of those scores may correspond with a score of "10." A person knowledgeable in the art will recognize that different score ranges and output associated with this process would not divert from the essence of these illustrative calculations.

In some examples, the scores may be aggregated and multiplied by a constant (e.g., a "gain," etc.). The constant may be pre-determined by an administrator based on a cyber risk analysis of the sub-indicator, in order of severity. In this instance, the final risk indicator score may be achieved by multiplying the constant(e.g., a "gain," etc.) by the output to get a risk score associated with the particular risk indicator.

Returning to FIG. 6, two illustrative examples are provided of this calculation by the executed software instructions. In first example 610, the risk indicator corresponds with "does any external-bound HTTPS traffic appear to be an anomaly?" In second example 620, the risk indicator corresponds with "does any HTTP traffic appear to be an anomaly?" upon determining the risk score for each example, the risk score for first example 610 is "1" and the risk score for second example 620 is "0.9," identifying that first example 610 represents more risk than second example 620.

The risk assessment indicators may be used to calculate a risk score, percentage, or ratios.

Over a time period, the risk assessment indicators may be used to alter the risk score, as illustrated in FIG. 8.

The risk score may be used to trigger an action performed by the system. The action may include, for example, disconnect the user, activate a flag, send a notification to an administrative user, etc. In some examples, the action may initiate a reauthentication process using biometrics as a service provider 114 in FIG. 1.

Figure 9:
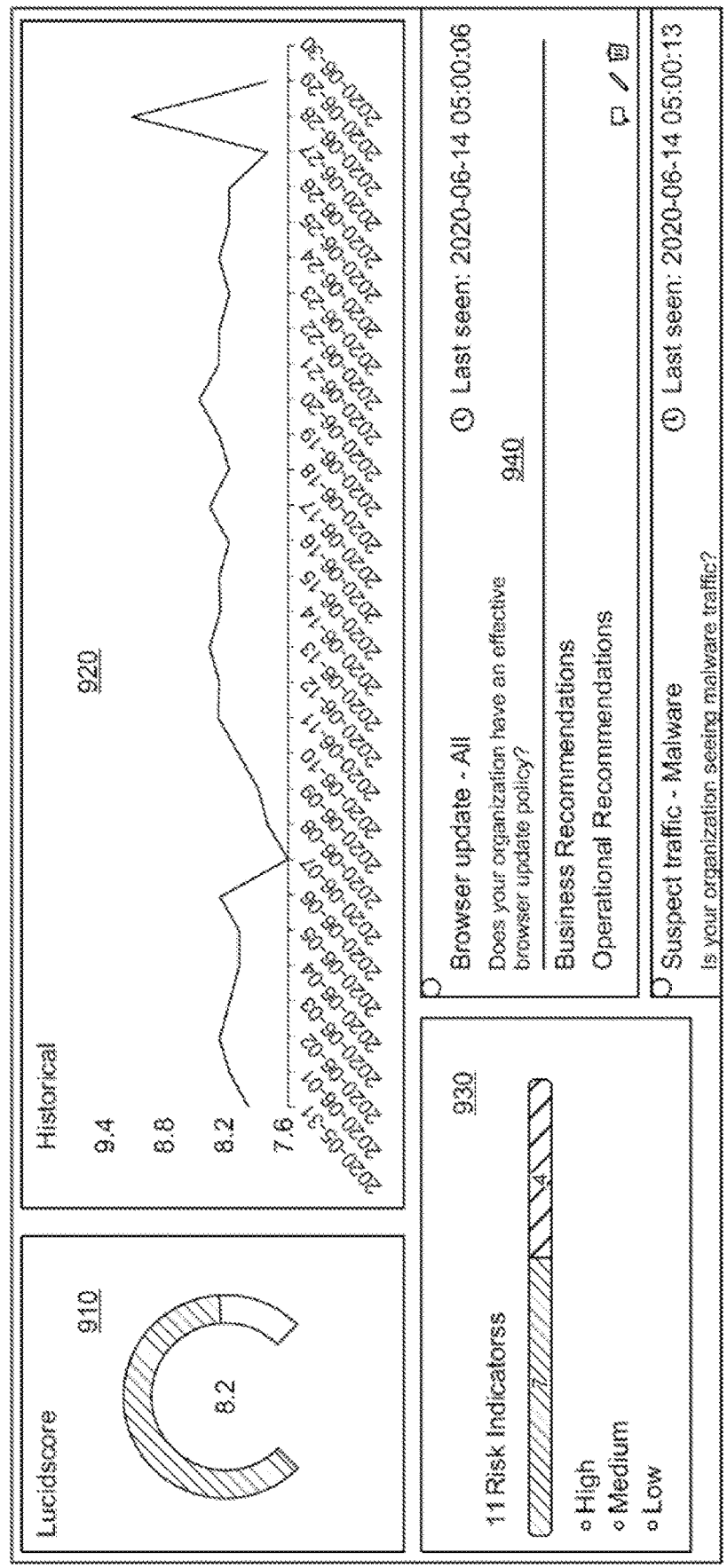
FIG. 9 is an interface for reviewing risk assessment indicators, in accordance with the embodiments disclosed herein.

FIG. 9 is an interface for reviewing risk assessment indicators, in accordance with the embodiments disclosed herein. In illustration 900, a user dashboard may provide an overall risk score 910, a timeline 920 of the overall risk score, a relative risk score 930, and a recommendation 940 for performing changes to the system to alter the risk score.

Overall risk score 910 may correspond with an average of all risk assessment indicators used to calculate each risk score, percentage, or ratio.

Timeline 920 of the overall risk score may correspond with the overall risk score as calculated in accordance with a particular time period. For example, the overall risk score may be calculated each day and used as input for the chart showing how the overall risk score is altered by day. Other time periods are available as well, including by hour, time range (e.g., 4 hours, 12 hours, etc.), every other day, by week, etc.

Relative risk score 930 may correspond with a number of risk indicators from risk indicator 710 illustrated in FIG. 7. The interface may distinguish between the different risk indicators in each range, including high risk, medium risk, or low risk. In some examples, the interface may provide an overall risk score 910 along a risk range. For example, the risk range may be low, medium, and high. Each portion of the risk range may correspond with threshold values, including zero to two as a low risk score, three to seven as a medium risk score, and eight to ten as a high risk score. Other values may be used without diverting from the essence of the disclosure.

In some examples, the user device may be reauthenticated. For example, the reauthentication process (e.g., as depicted with FIG. 3) may use overall risk score 910 and/or relative risk score 930 to initiate a reauthentication process, as described herein.

The process may determine a specific time for reauthentication. For example, the reauthentication time may correspond with receiving relatively high risk data. In another example, the reauthentication time may correspond with initiating a plurality of reauthentication requirements for the user device. The number of reauthentication requirements may increase in line with the increase risk score. In another example, the reauthentication process may be initiated at an ad-hoc or pre-determined time by an administrative user (e.g., Corporate IT). In still another example, the reauthentication may be initiated and accompany disconnecting the user device from enhanced security network 122 until further action to reduce the risk score and/or corresponding data is in place.

Recommendation 940 for performing changes to the system to alter the risk score may also be provided. For example, a risk assessment indicator that corresponds with a high risk may be identified by the system. Recommendation 940 may access the cloud storage with a repository of textual descriptions that correspond with each risk score in each particular high range. After searching and retrieving the stored textual description, the user dashboard may display the retrieved textual description associated with the risk score in the particular risk range. In some examples, the dashboard may be used by corporate information technology or administrator to oversee risk across its remote employee base.

Figure 10:
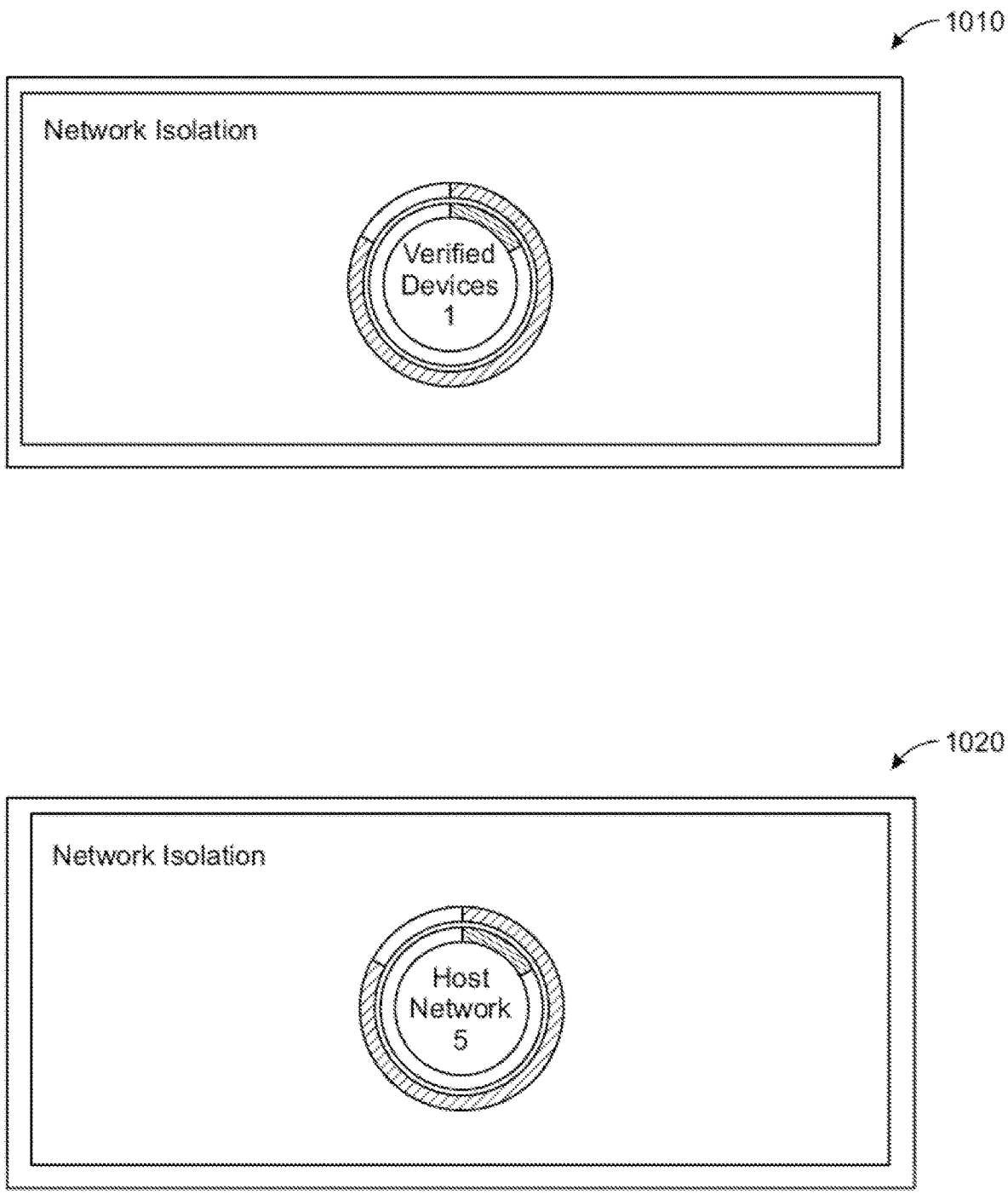
FIG. 10 is illustrative interfaces for reviewing devices connected to the networks, in accordance with the embodiments disclosed herein.

Devices may be isolated on each network and illustrated with the user dashboard. As shown in FIG. 10, first interface 1010 shows a number of user devices that are connected with enhanced security network 122 of FIG. 1 and second interface 1020 shows a number of user devices that are connected to home network 130 of FIG. 1. The calculation of the number of user devices on home network 130 may be a factor used to lower the estimated risk on enhanced security network 122, since the user device may by isolated from enhanced security network 122. In some examples, privacy may be maintained on home network 130 by counting user devices on home network 130 without intercepting traffic or analyzing data packets.

In some examples, a number of user devices may fluctuate and the system may adjust the risk score. For example, when a user device count associated with enhanced security network 122 decreases and the user device count associated with home network 130 increases within a pre-determined time period, the system may determine that the user device left enhanced security network 122 and joined home network 130. The risk score may be adjusted (e.g., increased, etc.) to account for the potentially unsecure data point moving from one network to another network.

In some examples, the system may determine whether a device is verified or not verified. This may include determining that a particular device has been removed from first interface 1010, and no longer included with devices that are connected with enhanced security network 122 of FIG. 1. The determination may also review data associated with second interface 1020 to determine whether the device is connected to home network 130 of FIG. 1.

Other recommendations are available as well, as illustrated in FIG. 11. In illustration 1100, the recommendation may be associated with the category of the risk assessment indicators. An operational recommendation may comprise, for example, "block access to known malware distribution IPs," "evaluate the resources needed to keep firewall rules up-to-date," "review the effectiveness of the current boundary protection security services (e.g., firewalls) to eliminate access to suspicious websites and IPs," and the like.

The recommendation may include a status of the network, for example, to provide business recommendations to C-level executives to help individuals of all backgrounds better appreciate the risk and impact to business operations and corresponding financial risk. For example, a business recommendation may comprise, for example, "less than 50% of your internal applications enforce/use a secure HTTPS protocol," "there is a risk to the confidentiality of your data by an insider who can act as a man-in-the-middle to copy all transferred files due to the user of an unsecured protocol," "make sure that your team enforces encryption on applications processing critical data," and the like.

The recommendation may include multiple steps to improve network security. For example, an operational recommendation may comprise, for example, "identify all internal web applications, classify their criticality, and enforce HTTPS on critical applications," and the like.

Available recommendations may comprise predetermined text-based phrases stored in a data store. Recommendations may be generated based on open standards, including ISO 27001, NIST 800-53, ITSG-33, and the like.

One or more recommendations may be selected from the data store of available recommendations based on a selection or filtering process. For example, a set of recommendations may be generated based on industry and business size that matches the corporation associated with risk mitigation computing device 120 in enhanced security network 122. The set of recommendations may be filtered in accordance with other factors as well (e.g., the risk score, sub-indicators that exceeded a risk threshold, etc.) to generate a set of selected recommendations to provide to the user interface, as illustrated with recommendation 940 of FIG. 9.

The set of selected recommendations can be used to generate action. For example, each of the predetermined text-based phrases stored in the data store that correspond with available recommendations may also correspond with a recommended action. When the recommendation is selected and/or included with the user interface, the system may access the corresponding actions for that recommendation. The actions may be assigned as tasks to the right administrative resource in the organization, including an internal information technology (IT) team member or an external managed service provider.

Any of the recommendation information may be stored with the data store as well. For example, the set of selected recommendations and corresponding actions that are provided to the user interface may be stored with a timestamp in the data store. When any of the actions are completed by the user (e.g., as identified from data packet traffic or explicit user interaction that confirms the action has been completed, etc.), this information may be stored with the data store as well.

Returning to FIG. 7, the interface may also be used for editing a risk assessment indicator. In illustration 700, a risk assessment indicator may be altered in a user dashboard. In some examples, the risk assessment indicator is altered by an administrative user associated with risk assessment computer system 110 as illustrated in FIG. 1 and/or detached from risk mitigation computing device 120 in enhanced security network 122.

The user dashboard may allow the administrative user to set an accessibility score range for the particular risk assessment indicator. In illustration 700, the risk assessment indicator associated with category "end of life (EOL) operating system (OS)—Windows®" may correspond with a risk score between zero and ten. When the risk score is seven or below, the textual description associated with the recommendation to the user may comprise, for example, "a limited number of EOL Windows OS machines exist on your network." When the risk score is between eight and ten, the textual description associated with the recommendation to the user may comprise, for example, "your organization has an unacceptable level of EOL Windows OS machines."

Figure 12:
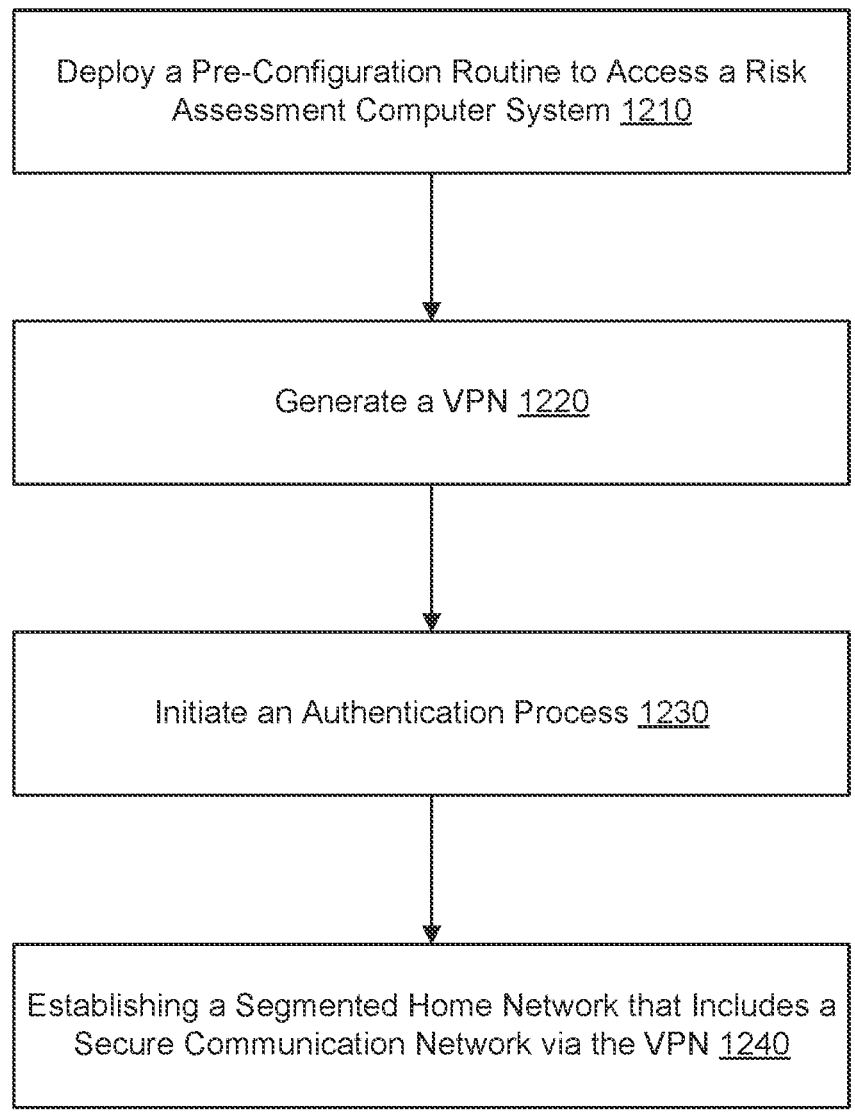
FIG. 12 is an illustrative process performed by the computing system in various features of embodiments of the disclosed technology.

FIG. 12 is an illustrative process performed by the computing system in various features of embodiments of the disclosed technology. The method may be performed by one or more hardware processors and machine-readable storage media storing a set of machine-readable/machine-executable instructions that, when executed, cause the hardware processor(s) to perform the illustrative method. The hardware processors and machine-readable storage media may correspond with, for example, a processor and machine-readable storage media of risk assessment computer system 110 or risk mitigation computing device 120 illustrated in FIG. 1, or any other processing unit suitable machine-readable storage media described herein.

At block 1210, a pre-configuration routine may be deployed. For example, a risk mitigation computing device at the first location may deploy a pre-configuration routine to access a risk assessment computer system that is remote from the first location.

At block 1220, a virtual private network (VPN) may be generated. For example, based on the pre-configuration routine, the VPN may be generated. The VPN may be automatically generated between the risk mitigation computing device at the first location and the risk assessment computer system.

At block 1230, an authentication process may be initiated. For example, the authentication process may be initiated by the risk assessment computer system to confirm an identity of a user operating the risk mitigation computing device.

At block 1240, a segmented home network may be established. The segmented home network may be established upon receiving an authentication approval associated with the authentication process. In some examples, the segmented home network may include the secure communication network via VPN to access the risk assessment computer system and a second communication network that does not access the secure communication network.

Figure 13:
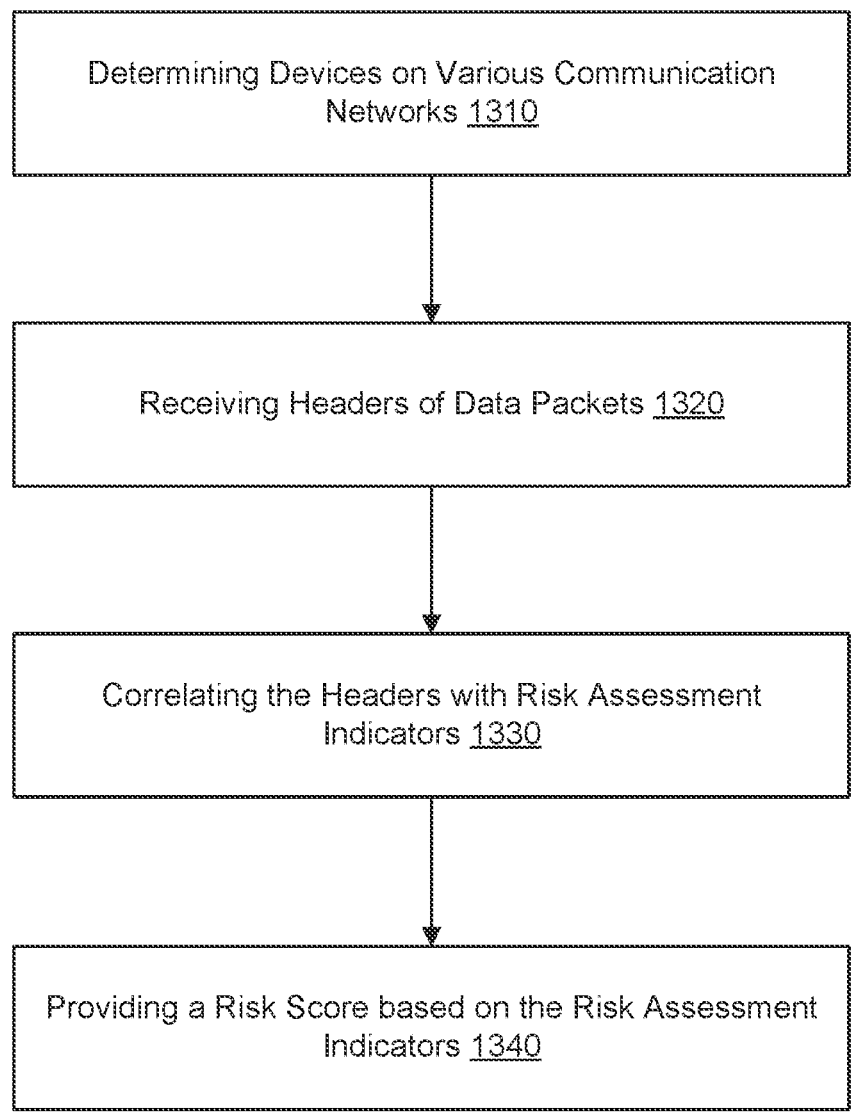
FIG. 13 is an illustrative process performed by the computing system in various features of embodiments of the disclosed technology.

In some examples, the secure communication network via VPN to access the risk assessment computer system can be created on multiple virtual network segments and/or separate devices. These devices can be segmented based on usage, for example, work, home, internet of things (IoT) in various ways. For example, the FIG. 13 is an illustrative process performed by the computing system in various features of embodiments of the disclosed technology. The method may be performed by one or more hardware processors and machine-readable storage media storing a set of machine-readable/machine-executable instructions that, when executed, cause the hardware processor(s) to perform the illustrative method. The hardware processors and machine-readable storage media may correspond with, for example, a processor and machine-readable storage media of risk assessment computer system 110 or risk mitigation computing device 120 illustrated in FIG. 1, or any other processing unit suitable machine-readable storage media described herein.

At block 1310, devices may be determined on various communication networks. For example, a risk assessment computer system may determine a first set of devices on an enhanced security communication network and a second set of devices on a home communication network. The risk assessment computer system may first enable a first network connection between the first set of devices and a cloud-based node via the enhanced security communication network and may second enable a second network connection between the second set of devices and an internet. The enhanced security communication network and the home communication network may be separate.

At block 1320, one or more headers of data packets may be received. For example, the risk assessment computer system may receive headers of data packets transmitted through the enhanced security communication network.

Attributes from the packet headers may be identified without identifying data in the data packet. Attributes may include, for example, a source that transmitted the data packet, a destination that will receive the data packet, network information, protocol detection information, protocol deep packet inspection (DPI) information, application detection information, device discovery information, geolocation, and/or agent information. Additional information regarding the attributes is provided with FIG. 4.

At block 1330, the headers may be correlated with risk assessment indicators. For example, the risk assessment computer system may correlate the headers of data packets with risk assessment indicators. For example, using the attributes from the packet headers, the risk assessment engine on risk assessment computer system 410 in FIG. 4 can identify which risk assessment indicators are present in the network traffic.

In some examples, the correlation process includes executing one or more specific algorithms to compute the risk assessment. For example, various queries may be posed for identifying the risk in the network traffic. The queries may be grouped by category, including protocol (e.g., telnet ingress, etc.), anomaly detection (e.g., DNS requests, FTP, RDP, SMB, SSL, HTTP/HTTPS, etc.), security policies (e.g., browser update, operating system, etc.), device detection (e.g., end of life device, etc.), and the like. Each category may be associated with one or more queries, including "are there Telnet sessions connecting from outside your network to resources inside your network," "do any DNS requests appear to be an anomaly," "do any FTP flows appear to be an anomaly," "do any RDP flows appear to be an anomaly," "do any SMB flows appear to be an anomaly," "do any SSL flows appear to be an anomaly," "does any external-bound HTTPS traffic appear to be an anomaly," "does any HTTP traffic appear to be an anomaly," "does any internal HTTPS traffic appear to be an anomaly," "does any internal HTTP traffic appear to be an anomaly," "does your organization have an effective Chrome® browser update policy," "does your organization have an effective IE/Edge® browser update policy," "does your organization have an effective OS update policy," "does your organization have end of life iOS devices," and the like.

The risk assessment engine implemented by risk assessment computer system 410 may collect the potential risk assessment indicators and data packet headers from the cloud storage to search for specific patterns using analytics.

At block 1340, a risk score may be provided. For example, the risk assessment computer system may provide a risk score based on the risk assessment indicators correlated with the headers of data packets.

An illustrative sample rubric of scoring a risk indicator is illustrated with FIG. 7. For example, the risk indicator includes "Does your Organization have End of Life Windows® OS machines?" Sub-indicators may be included with each risk indicator. The sub-indicators may correspond with software instructions that query the data stored in the database to return a Yes or No answer.

When risk indicator is selected, the risk assessment engine implemented by risk assessment computer system 410 may execute the software instructions associated with each of the corresponding sub-indicators. The output from the executed software instructions (e.g., binary 0/1 or yes/no, etc.) may be compared with a rubric to determine a score for each of sub-indicators.

In some examples, the output from the executed software instructions may be compared with a threshold. For example, the software instructions can determine the data corresponding with the sub-indicator and compare the data with a threshold for the sub-indicator. When the data exceeds the threshold (e.g., 10%), the data corresponding with the sub-indicator may be greater than the threshold and the executed software instructions may determine the output for the sub-indicator based on the data exceeding the threshold (e.g., yes or no, etc.).

The scores may be aggregated to determine a total score for risk indicator 710. For example, when the output for each sub-indicator is "yes," the aggregation of those scores may correspond with a score of "10." A person knowledgeable in the art will recognize that different score ranges and output associated with this process would not divert from the essence of these illustrative calculations.

In some examples, the scores may be aggregated and multiplied by a constant (e.g., a "gain," etc.). The constant may be pre-determined by an administrator based on a cyber risk analysis of the sub-indicator, in order of severity. In this instance, the final risk indicator score may be achieved by multiplying the constant(e.g., a "gain," etc.) by the output to get a risk score associated with the particular risk indicator.

Figure 14:
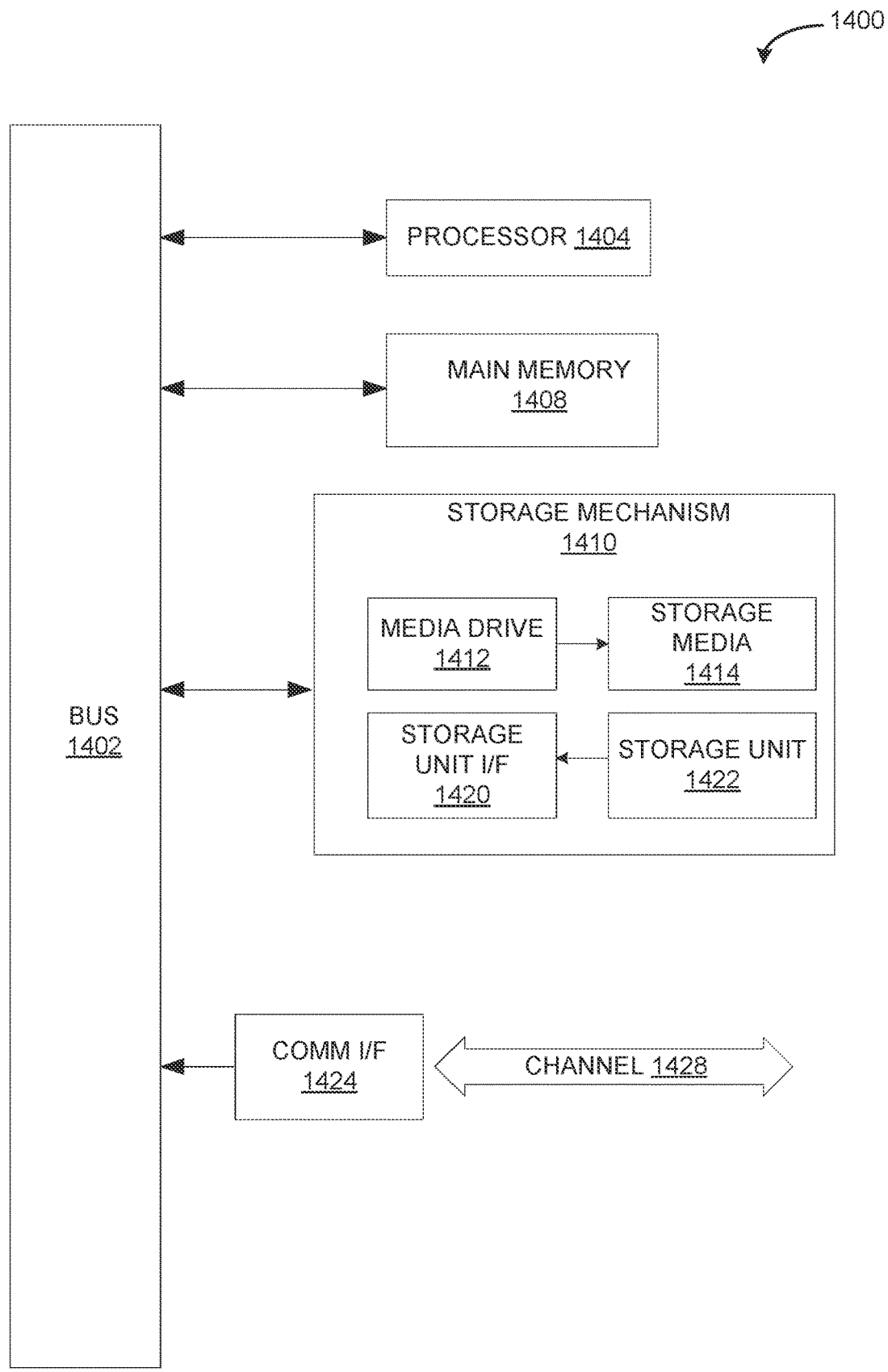
FIG. 14 is an example of a computing system that may be used in implementing various features of embodiments of the disclosed technology.

In some examples, the process may initiate an action. The action may be initiated based on the risk score and/or the result of a specific risk indicator (or subset of risk indicators). The action may include, for example, disconnecting a user device in the first set of devices from the enhanced security communication network, while maintaining the second network connection between the second set of devices and the internet. In another example, the action includes reauthenticating a user device in the first set of devices from the enhanced security communication network, while maintaining the second network connection between the second set of devices and the internet.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 14. Various embodiments are described in terms of this example logical circuit 1400. After reading this description, it will become apparent to a person skilled in the relevant art how to implement the technology using other logical circuits or architectures.

Referring now to FIG. 14, computing system 1400 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 1400 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1400 might include, for example, one or more processors, controllers, control engines, or other processing devices, such as a processor 1404. Processor 1404 might be implemented using a general-purpose or special-purpose processing engine such as, for example, a microprocessor, controller, or other control logic. In the illustrated example, processor 1404 is connected to a bus 1402, although any communication medium can be used to facilitate interaction with other components of logical circuit 1400 or to communicate externally.

Computing system 1400 might also include one or more memory engines, simply referred to herein as main memory 1408. For example, preferably random-access memory (RAM) or other dynamic memory, might be used for storing information and instructions to be executed by processor 1404. Main memory 1408 might also be used for storing temporary variables or other intermediate information during execution of instructions to be executed by processor 1404. Logical circuit 1400 might likewise include a read only memory ("ROM") or other static storage device coupled to bus 1402 for storing static information and instructions for processor 1404.

The computing system 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to, or accessed by media drive 1412. As these examples illustrate, the storage media 1414 can include a computer usable storage medium having stored therein computer software or data.

In alternative embodiments, information storage mechanism 1440 might include other similar instrumentalities for allowing computer programs or other instructions or data to be loaded into logical circuit 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory engine) and memory slot, a PCMCIA slot and card, and other fixed or removable storage units 1422 and interfaces 1420 that allow software and data to be transferred from the storage unit 1422 to logical circuit 1400.

Logical circuit 1400 might also include a communications interface 1424. Communications interface 1424 might be used to allow software and data to be transferred between logical circuit 1400 and external devices. Examples of communications interface 1424 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1400 to perform features or functions of the disclosed technology as discussed herein.

Although FIG. 14 depicts a computer network, it is understood that the disclosure is not limited to operation with a computer network, but rather, the disclosure may be practiced in any suitable electronic device. Accordingly, the computer network depicted in FIG. 14 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method for establishing an enhanced security communication network, the method comprising:
establishing, in a home communication network, an enhanced security communication network, the enhanced security communication network being segmented from the home communication network;

determining, by a risk assessment computer system, a first set of devices on the enhanced security communication network and a second set of devices on the home communication network, wherein the risk assessment computer system forms part of the enhanced security communication network and the home communication network and enables a first network connection between the first set of devices and a cloud-based node via the enhanced security communication network and enables a second network connection between the second set of devices and an internet;

receiving, by the risk assessment computer system, headers of data packets transmitted through the enhanced security communication network;

correlating the headers of data packets with risk assessment indicators;

providing, by the risk assessment computer system, a risk score based on the risk assessment indicators correlated with the headers of data packets; and initiating an authentication action in respect of a device in the first set of devices and based on the risk score.

2. The method of claim 1, wherein the authentication action includes disconnecting the device in the first set of devices from the enhanced security communication network, while maintaining the second network connection between the second set of devices and the internet.

3. The method of claim 1, wherein the authentication action includes reauthenticating the device in the first set of devices from the enhanced security communication network, while maintaining the second network connection between the second set of devices and the internet.

4. The method of claim 1, wherein attributes from the headers of data packets are identified without identifying data in the data packets.

5. The method of claim 4, wherein the attributes comprise one or more of a source that transmitted the data packet, a destination that will receive the data packet, network information, protocol detection information, protocol deep packet inspection (DPI) information, application detection information, device discovery information, geolocation, or agent information.

6. The method of claim 1, wherein correlating the headers of data packets with the risk assessment indicators comprises executing one or more specific algorithms to compute the risk assessment.

7. The method of claim 6, wherein output from the one or more specific algorithms is compared to a rubric to determine the risk score.

8. A non-transitory computer-readable storage medium storing a plurality of instructions executable by one or more processors, the plurality of instructions when executed by the one or more processors cause the one or more processors to:

establish, in a home communication network, an enhanced security communication network, the enhanced security communication network being segmented from the home communication network;

determine a first set of devices on the enhanced security communication network and a second set of devices on the home communication network, wherein the risk assessment computer system forms part of the enhanced security communication network and the home communication network and enables a first network connection between the first set of devices and a cloud-based node via the enhanced security communication network and enables a second network connection between the second set of devices and an internet;

receive headers of data packets transmitted through the enhanced security communication network;

correlate the headers of data packets with risk assessment indicators;

provide a risk score based on the risk assessment indicators correlated with the headers of data packets; and initiate an authentication action in respect of a device in the first set of devices and based on the risk score.

9. The computer-readable storage medium of claim 8, wherein the authentication action includes disconnecting the device in the first set of devices from the enhanced security communication network, while maintaining the second network connection between the second set of devices and the internet.

10. The computer-readable storage medium of claim 8, wherein the authentication action includes reauthenticating the device in the first set of devices from the enhanced security communication network, while maintaining the second network connection between the second set of devices and the internet.

11. The computer-readable storage medium of claim 8, wherein attributes from the headers of data packets are identified without identifying data in the data packets.

12. The computer-readable storage medium of claim 11, wherein the attributes comprise one or more of a source that transmitted the data packet, a destination that will receive the data packet, network information, protocol detection information, protocol deep packet inspection (DPI) information, application detection information, device discovery information, geolocation, or agent information.

13. The computer-readable storage medium of claim 8, wherein correlating the headers of data packets with the risk assessment indicators comprises executing one or more specific algorithms to compute the risk assessment.

14. The computer-readable storage medium of claim 13, wherein output from the one or more specific algorithms is compared to a rubric to determine the risk score.

15. A risk mitigation computing device for establishing an enhanced security communication network at a first location, wherein the risk mitigation computing device comprises:

one or more computer processors;

one or more computer readable storage media for storing computer-implemented instructions, wherein the one or more computer processors are configured to execute the computer-implemented instructions to cause the computer system to perform a method comprising:

establishing, in a home communication network, an enhanced security communication network, the enhanced security communication network being segmented from the home communication network;

determining a first set of devices on the enhanced security communication network and a second set of devices on the home communication network, wherein the risk assessment computer system forms part of the enhanced security communication network and the home communication network and enables a first network connection between the first set of devices and a cloud-based node via the enhanced security communication network and enables a second network connection between the second set of devices and an internet;

receiving headers of data packets transmitted through the enhanced security communication network;

correlating the headers of data packets with risk assessment indicators;

providing a risk score based on the risk assessment indicators correlated with the headers of data packets; and initiating an authentication action in respect of a device in the first set of devices and based on the risk score.

16. The risk mitigation computing device of claim 15, wherein the authentication action includes disconnecting the device in the first set of devices from the enhanced security communication network, while maintaining the second network connection between the second set of devices and the internet.

17. The risk mitigation computing device of claim 15, wherein the authentication action includes reauthenticating the device in the first set of devices from the enhanced security communication network, while maintaining the second network connection between the second set of devices and the internet.

18. The risk mitigation computing device of claim 15, wherein attributes from the headers of data packets are identified without identifying data in the data packets.

19. The risk mitigation computing device of claim 15, wherein correlating the headers of data packets with the risk assessment indicators comprises executing one or more specific algorithms to compute the risk assessment.

20. The risk mitigation computing device of claim 19, wherein output from the one or more specific algorithms is compared to a rubric to determine the risk score.

* * * * *